(12) United States Patent
Lenarcic

(10) Patent No.: US 11,649,798 B2
(45) Date of Patent: May 16, 2023

(54) REVERSIBLE PUMP TURBINE AND GUIDE VANE FOR THE REVERSIBLE PUMP TURBINE

(71) Applicant: Andritz AG, Graz (AT)

(72) Inventor: Markus Lenarcic, Vienna (AT)

(73) Assignee: ANDRITZ AG, Graz (AT)

( * ) Notice: Subject to any disclaimer, the term of this patent is extended or adjusted under 35 U.S.C. 154(b) by 45 days.

(21) Appl. No.: 17/258,221

(22) PCT Filed: Aug. 12, 2019

(86) PCT No.: PCT/EP2019/071603
§ 371 (c)(1),
(2) Date: Jan. 6, 2021

(87) PCT Pub. No.: WO2020/035452
PCT Pub. Date: Feb. 20, 2020

(65) Prior Publication Data
US 2021/0285414 A1  Sep. 16, 2021

(30) Foreign Application Priority Data

Aug. 14, 2018  (AT) ................ A 50690/2018

(51) Int. Cl.
*F03B 3/18*  (2006.01)
(52) U.S. Cl.
CPC .......... *F03B 3/183* (2013.01); *F05B 2240/12* (2013.01); *F05B 2240/304* (2020.08)
(58) Field of Classification Search
CPC .... F03B 3/18; F03B 3/16; F03B 3/183; F05B 2240/12; F05B 2240/304
See application file for complete search history.

(56) References Cited

U.S. PATENT DOCUMENTS

| 6,007,297 A | 12/1999 | Buchelt |
| 6,334,757 B1 * | 1/2002 | Iwano ............ F03B 3/06 415/164 |
| 2018/0313320 A1 * | 11/2018 | Nakamura ......... F03B 3/183 |

FOREIGN PATENT DOCUMENTS

| DE | 19950227 A1 | 11/2000 | |
| FR | 372975 A | 4/1907 | |
| GB | 2471152 A * | 12/2010 | ............ F01D 5/141 |
| JP | 2003090279 A | 3/2003 | |

OTHER PUBLICATIONS

International Search Report dated Oct. 4, 2019 for International Patent Application No. PCT/EP2019/071603.
International Preliminary Report on Patentability dated Jul. 24, 2020 for International Patent Application No. PCT/EP2019/071603.

* cited by examiner

*Primary Examiner* — Courtney D Heinle
*Assistant Examiner* — Ryan C Clark
(74) *Attorney, Agent, or Firm* — Alix, Yale & Ristas, LLP

(57) ABSTRACT

A reversible pump-turbine and also a guide vane for a reversible pump-turbine with a guide vane body, a pivot for rotating the guide vane body around an axis of rotation and two end faces. The guide vane body has a turbine leading edge facing the turbine flow and a turbine trailing edge facing away from the turbine flow, where the individual guide vanes come into contact with one another along closing edges when the wicket gate is closed, where the guide vanes each have two flow-guiding surfaces on either side of the axis of rotation and opposite one another that are limited by the two end faces. These two flow-guiding surfaces have different flow profiles.

21 Claims, 12 Drawing Sheets

REVERSIBLE PUMP TURBINE AND GUIDE VANE FOR THE REVERSIBLE PUMP TURBINE

BACKGROUND

The disclosed embodiments relate to a reversible pump-turbine with a runner and a wicket gate comprising a plurality of guide vanes, each comprising a guide vane body limited by end faces and a pivot for rotating the guide vane body round an axis of rotation. By rotating the guide vanes, the wicket gate can be opened and closed. The guide vane body has a turbine leading edge facing the turbine flow and a turbine trailing edge facing away from the turbine flow. When the wicket gate is closed, the individual guide vanes come into contact with one another along closing edges that are defined by the contact curves of adjacent guide vanes. Here, the guide vanes each have two flow-guiding surfaces on either side of the axis of rotation that are opposite one another and are limited by the two end faces.

The disclosure also relates to a guide vane for the reversible pump-turbine.

The guide vanes in a reversible pump-turbine are arranged upstream of the runner in turbine operation and downstream of the runner in pump operation. They comprise a guide vane body and a pivot. All of the guide vanes together form the wicket gate. The guide vane body is rotated directly by turning the pivot round an axis of rotation. Hence, there is a specific wicket gate position in which adjacent guide vanes are in contact with one another along the closing edges when the guide vanes have been installed. By adjusting the guide vanes, the pump-turbine can be set from one operating point to another. Operating pump-turbines is much more complex than operating conventional turbines and requires short switch-over times between pump and turbine operation.

The switch-over times for a pump-turbine from pumping to turbine operation are largely determined by the duration of the synchronisation process during which the rotational frequency of the hydraulic machine is synchronised with that of the electric power grid. If the no-load characteristic curve shows turbine instability at the synchronisation point, the torque fluctuations this induces can cause significant delays in successful synchronisation. Under such conditions, out-of-phase pressure and flow pulsations occur whose amplitudes can induce fluid-mechanical vibration in the hydraulic machine under resonance conditions. This scenario presents a safety risk for the power plant operator. The probability of such an occurrence can be reduced by preventing turbine instabilities around the synchronisation point.

In the course of load rejection (as a result of a fault or power failure for example), the runner accelerates to runaway speed and the pump-turbine undergoes transient operating conditions with different pressure levels. In addition to runaway speed, the pressure increase in the volute casing and the pressure drop in the draft tube are the main design parameters for a pumped-storage power plant. The stronger the turbine instability is at the given boundary conditions, the larger the pressure increase in the volute casing and the pressure drop in the draft tube. In an emergency, the latter can cause so-called water-column separation in the draft tube, which generates large amounts of steam due to cavitation formation. As the volume available inside the hydraulic machine is almost constant, the axial thrust acting on the runner increases accordingly. A scenario of this kind normally leads to irreparable damage to the hydraulic machine and the powerhouse, representing a serious safety problem in the operation of pumped-storage power plants.

As a result, a design that provides smooth and stable operation must be ensured in addition to high efficiencies and good cavitation characteristics both in pumping and in turbine operation. Specific requirements in terms of operating stability in the course of transient manoeuvres are an essential part of every international tendering process, and it is imperative that the manufacturers meet these requirements.

It has been discovered that turbine instabilities caused by the flow interact directly with the wicket gate and can be influenced in different ways depending on the design of the guide vane. The occurrence of turbine instabilities can generally be attributed to the existence of revolving, stable vortex structures in the vaneless space, that is to say the space between the wicket gate and the runner. These vortex formations impede the turbine flow exiting from the wicket gate, increase losses in the pump-turbine, and ultimately cause unstable operating conditions, which can cause corresponding pressure and flow pulsations and facilitate system excitation. In order to increase the turbine stability of pump-turbines, the revolving, stable vortex structures in the vaneless space must be interrupted or destabilised.

One possible method of stabilising operation is the so-called misaligned guide vane. Here, individual guide vanes are moved independently of the other guide vanes by means of individual servomotors. However, this control variant is expensive and entails a greater risk of failure for the basic safety concept. As the closing procedures must continue to function properly, especially in the event of load rejection (due to a fault, for example), misaligned guide vanes are not entirely accepted as a safety mechanism. There is a very clear trend here that is moving away from this kind of actuator, particularly in future markets.

With a conventional guide vane, the flow profiles are typically parallel and congruent (see FIG. 1). Hence, the limiting surface of the guide vane body represents a cylindrical surface. The leading and trailing edges are straight lines (see FIG. 2).

In order to increase the hydraulic efficiency, guide vanes with a different shape are also used so that all flow profiles are congruent, but not parallel—see DE 199 59 227 A1 for example. The shape of these guide vanes results essentially from identical flow profiles that are misaligned in relation to one another.

AT 405 756 B discloses guide vanes with different flow profiles that are optimized in terms of efficiency at full and at part load.

The state-of-the-art guide vane has the disadvantage that its design is not flexible enough to be able to meet the demands of turbine stability, efficiency, cavitation characteristics and regulating range.

SUMMARY

The aim of the disclosed embodiments is thus to increase the turbine stability of pump-turbines during transient manoeuvres, i.e. during the synchronisation process and in the event of load rejection. At the same time, the turbine achieves a level of efficiency that is comparable to that of a conventional guide vane. Similarly, the disclosed embodiments do not have a significant impact on the pump stability nor its cavitation characteristics.

Thus, provided herein are embodiments in which the flow-guiding surfaces of the respective guide vane form different flow profiles.

Hence, the guide vane body is not cylindrical and features a curvature that is created by the different shape of the flow profiles. Due to this special shape of guide vane, the flow can be guided in such a way that it specifically reaches the areas where the vortex structures occur, destabilises these vortex formations that are responsible for the turbine instability and thus significantly improves operating stability.

As the flow profiles differ from one another, i.e. they are not congruent, a stabilizing effect can be achieved specifically in one area and an "efficiency-maintaining" effect in another area of the guide vane.

It is preferable if the turbine trailing edge and the closing edge of the guide vane is curved at least once.

It is also feasible that the turbine trailing edge of the guide vane and/or at least one closing edge of the guide vane has double curvature.

According to the invention, the flow profile in the mid-span section of the guide vane creates a different—in fact larger—absolute flow angle $\alpha_2$ of the absolute velocity of the turbine flow at the guide vane trailing edge in turbine direction, with regard to the related circumferential component of the absolute velocity of the turbine flow, than a flow profile in the boundary area of the guide vane so the turbine flow in turbine direction leaves the guide vane body in the mid-span section with a different flow angle $\alpha_2$ than when it leaves the guide vane body in the boundary area.

Here, the mid-span section of the guide vane is approximately in the centre between the two end faces of the guide vane.

Due to the fact that the flow angle α2 is larger in the mid-span section, the radially-acting momentum of the flow is increased towards the runner, destabilising the stable, revolving vortex formations in the vaneless space and subsequently achieving more stable operating conditions in the reversible pump-turbine. Here, the boundary area is understood as being the area near the end faces of the guide vane body.

The inventor has noted that the undesirable vortex formations in the vaneless space can be destabilised as a result.

Intensified radially-acting momentum of the flow can be achieved in the mid-span section of the guide vane, for example if the turbine trailing edge of the guide vane is curved in the mid-span section in a direction that is perpendicular to a plane defined by the axis of rotation and a connecting line between the turbine leading edge and the turbine trailing edge. In this case, the guide vane is curved in the direction of the guide vane pressure side (in turbine direction).

Idealised, the guide vane angle corresponds to the absolute flow angle of the absolute velocity of the turbine flow along the guide vane profile (see FIG. 12). Idealised, the flow follows the guide vane profile.

Hence, according to the invention, the flow profile in the mid-span section of the guide vane has a larger guide vane angle in the area of the turbine trailing edge than a flow profile in the boundary area of the guide vane so the turbine flow in turbine direction leaves the guide vane body at the mid-span section with a larger flow angle than if it leaves in the boundary area.

A favourable embodiment of the invention is characterised in that the position of at least one flow profile is rotated around a straight line that is disposed in parallel to the axis of rotation of the guide vane. The stabilising effect can be intensified again as a result of the rotation.

A favourable development of the invention is characterised in that the radial position of at least one flow profile is misaligned in relation to a straight line. This makes the guide vane much more flexible in its design.

An advantageous embodiment of the invention is characterised in that the turbine leading edge is curved at least once, whereby the turbine trailing edge can also be curved at least once as an alternative or in addition. With these measures, the highest efficiencies are achieved and, at the same time, the vortex structures responsible for the turbine instability are destabilised.

BRIEF DESCRIPTION OF THE DRAWINGS

The invention is explained in more detail in the attached figures using some embodiment examples.

DETAILED DESCRIPTION

Figure 1:
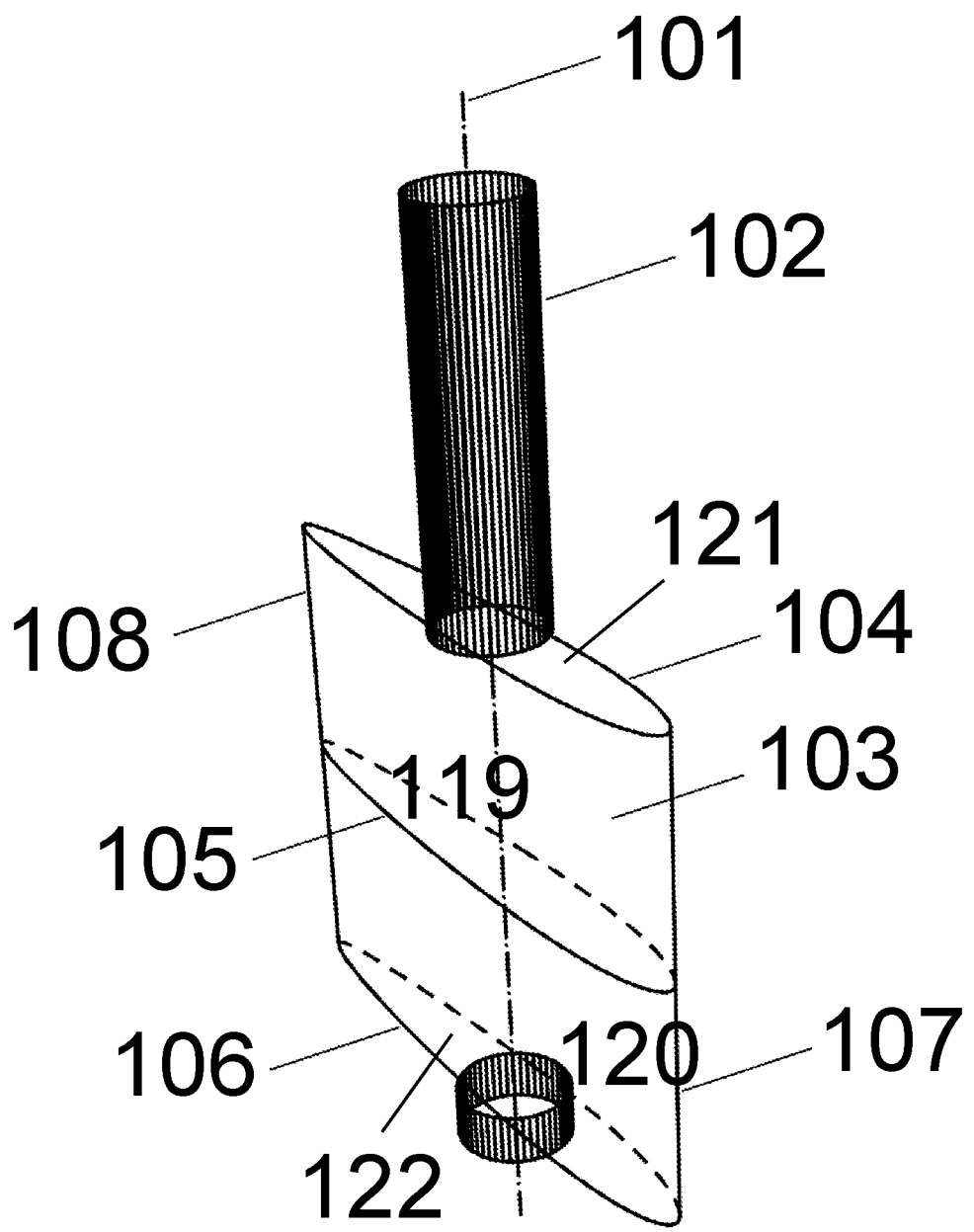
FIG. 1 shows a perspective view of a conventional guide vane according to the state of the art.

A guide vane according to the state of the art is illustrated in FIG. 1. The same parts have the same reference numerals in the following. This guide vane has a guide vane axis of rotation 101, a pivot 102 and a guide vane body 103. The guide vane body 103 is defined by the flow profiles 104, 105 and 106, which are parallel to one another and congruent. Hence, the guide vane has a cymmetrical guide vane body 103. The same flow profiles 104, 105 and 106 define opposite flow-guiding surfaces 119 and 120 that are limited by the two end faces 121, 122. The turbine leading edge 107 and the turbine trailing edge 8 are straight lines. This shape of the flow profiles 104, 105 and 106 and of the guide vane body 103 is normally designed for maximum efficiency. The vortex structures occurring (in the space between wicket gate and runner of the pump-turbine) cannot be destabilised with such a design.

Figure 2:
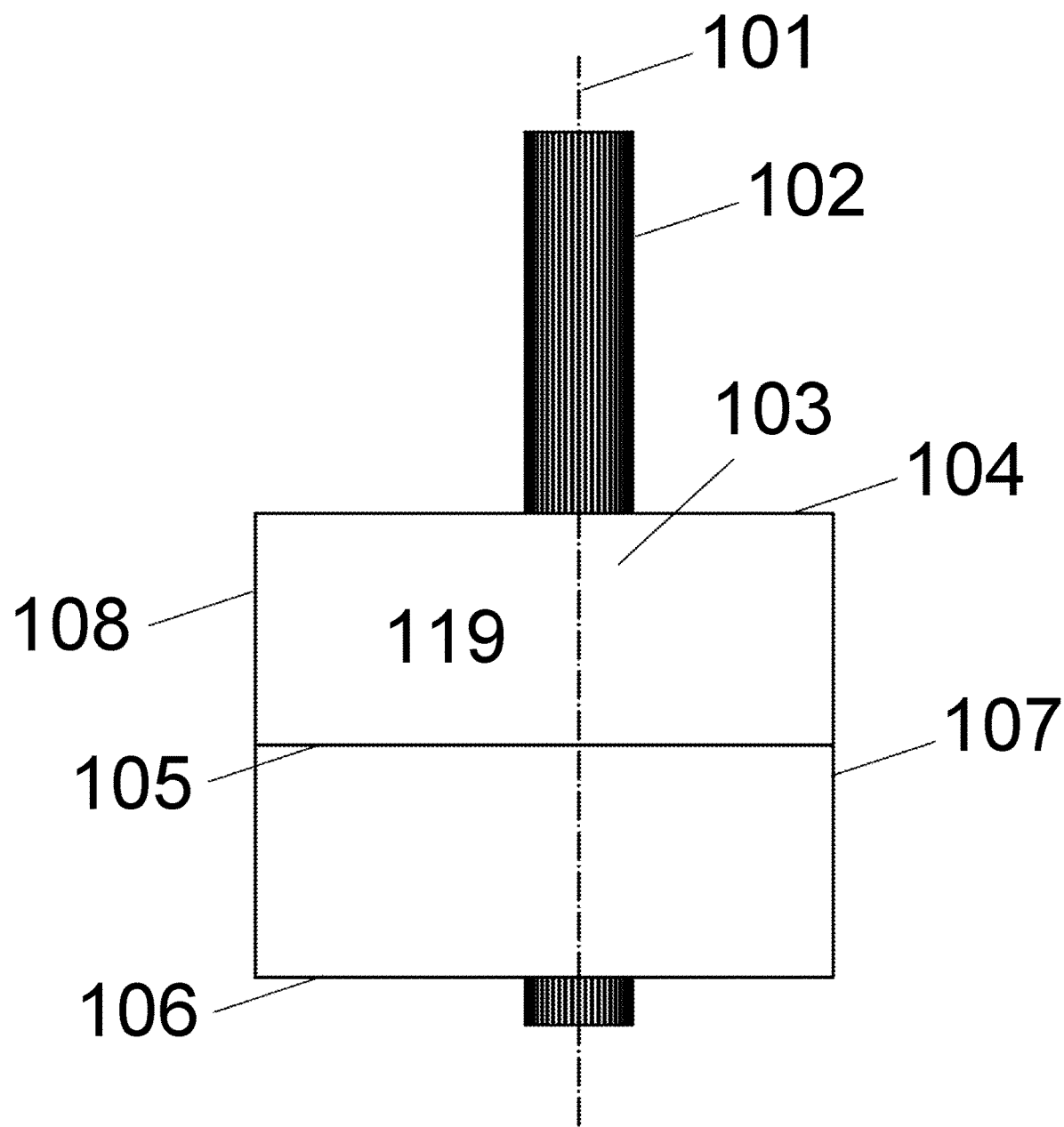
FIG. 2 shows a side view of a conventional guide vane according to FIG. 1.

The side view of the guide vane in FIG. 2 clearly shows that the turbine leading edge 107 and the turbine trailing edge 108 are straight lines and are aligned in parallel to the guide vane axis of rotation 101. The guide vane body 103 is limited by a top flow profile 104 and a bottom flow profile 106, which form the end faces of the guide vane body 103. Therefore, every flow profile 105 between the top flow profile 104 and the bottom flow profile 106, respectively, have the same shape. The guide vane body 103 is defined by the flow profiles 104, 105 and 106, which are parallel to one another and congruent.

Figure 3:
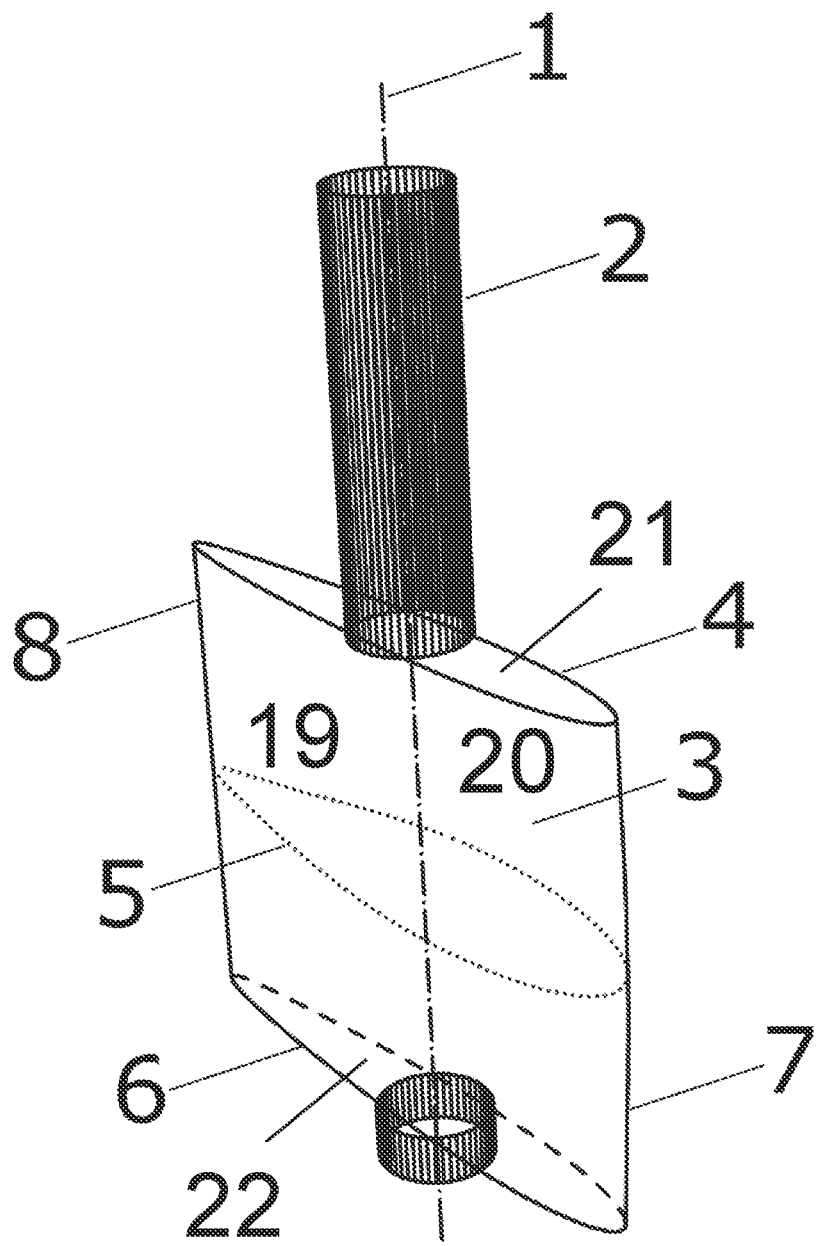
FIG. 3 shows a perspective view of a first embodiment of a guide vane according to the disclosure.

FIG. 3 shows a perspective view of a first variant of a guide vane according to the invention. It corresponds largely to an embodiment of the prior art guid vane according to FIG. 1, with a guide vane axis of rotation 1, a pivot 2, a guide vane body 3, a turbine leading edge 7 and a turbine trailing edge 8. The guide vane body 3 is also defined by the flow profiles 4, 5 and 6. Unlike the state of the art, flow profile 5 is not congruent with flow profiles 4 and 6 and is generally located in a random position between the end faces, 21 and 22. Flow profile 5, for example, stabilises the flow, while flow profiles 4 and 6 maximize the efficiency. The connecting lines between the individual flow profiles 4, 5 and 6 correspond advantageously to B-spline curves and form opposite flow-guiding surfaces 19 and 20 that are limited by the two end faces 21, 22. As a basic principle, one or both flow profiles 4, 6 at the end faces 21, 22 of the guide vane body 3 can also be designed to stabilise the flow and not be congruent with one another.

Figure 4:
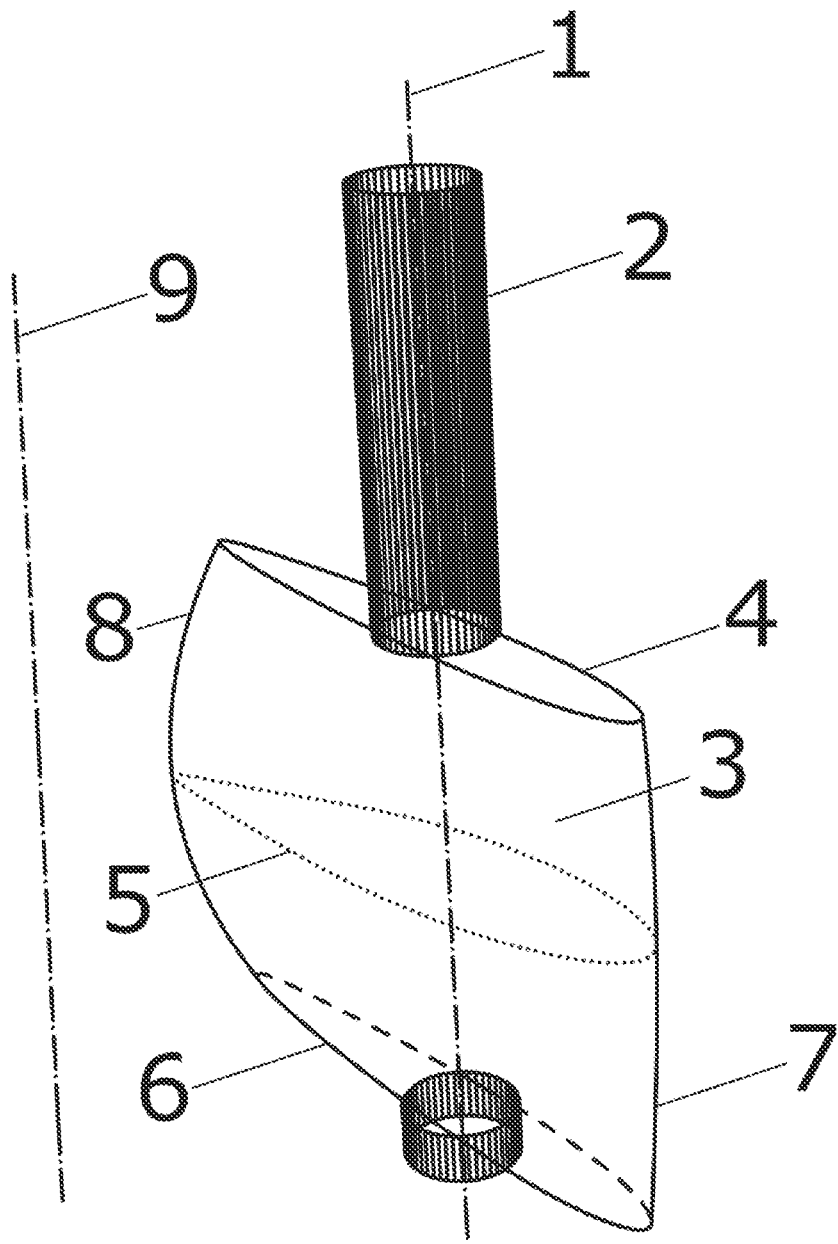
FIG. 4 shows a perspective view of a second embodiment of a guide vane according to the disclosure.

FIG. 4 illustrates a second embodiment of the disclosed guide vane. Here, too, flow profile 5 is not congruent with flow profiles 4 and 6. In addition, flow profile 5 is rotated in relation to a straight line 9. The straight line 9, for example, is disposed in parallel to the guide vane axis of rotation 1. Flow profile 5, for example, stabilises the flow, while flow profiles 4 and 6 maximize the efficiency. The connecting lines between the individual flow profiles 4, 5 and 6 correspond advantageously to B-spline curves. As a result of this rotation, the turbine leading edge 7 and turbine trailing edge 8 do not form straight lines, but curves.

Figure 5:
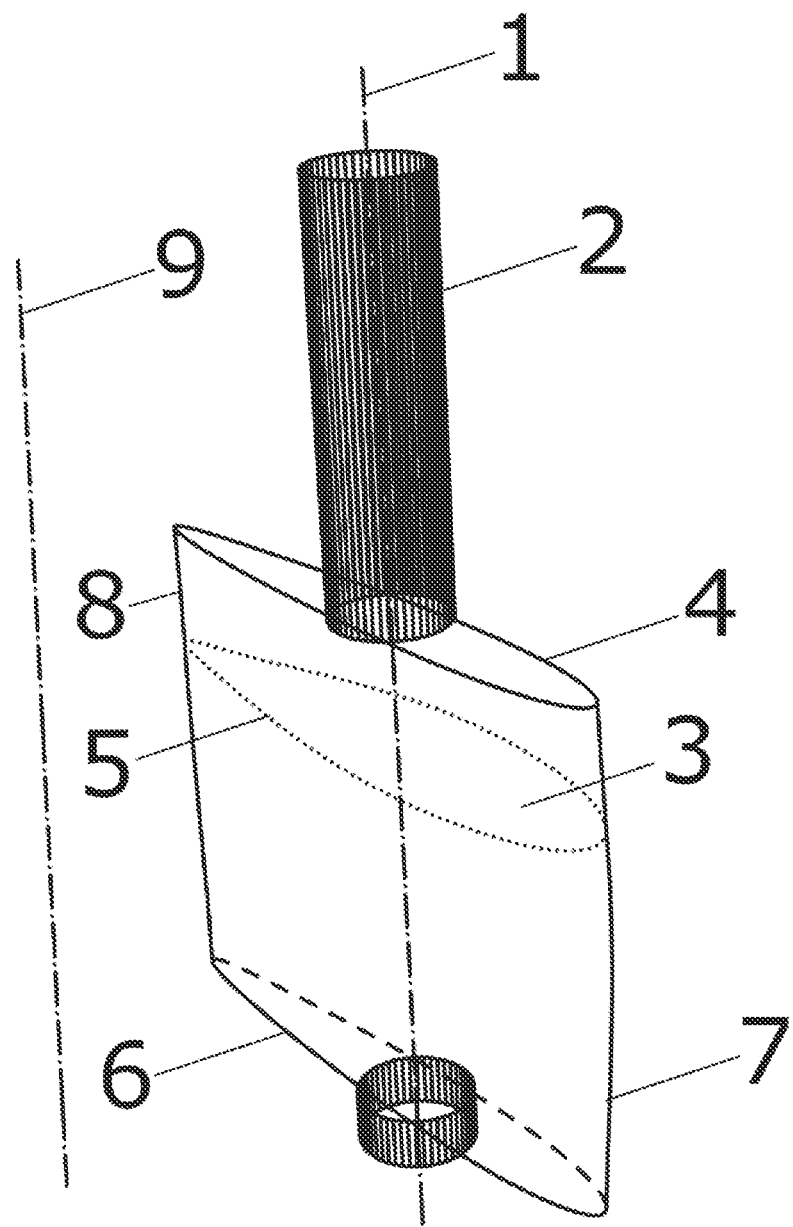
FIG. 5 shows a perspective view of a third embodiment of a guide vane according to the disclosure.

FIG. 5 shows another embodiment of the disclosed guide vane, where the flow profile 5 here is not congruent with flow profiles 4 and 6 and is located at a different position on the guide vane body 3 (axially or vertically displaced along a straight line 9 compared to the variant in FIG. 3). The straight line 9, for example, is positioned in parallel to the guide vane axis of rotation 1. Flow profile 5, for example, stabilises the flow, while flow profiles 4 and 6 maximize the efficiency. The connecting lines between the individual flow profiles 4, 5 and 6 correspond advantageously to B-spline curves.

Figure 6:
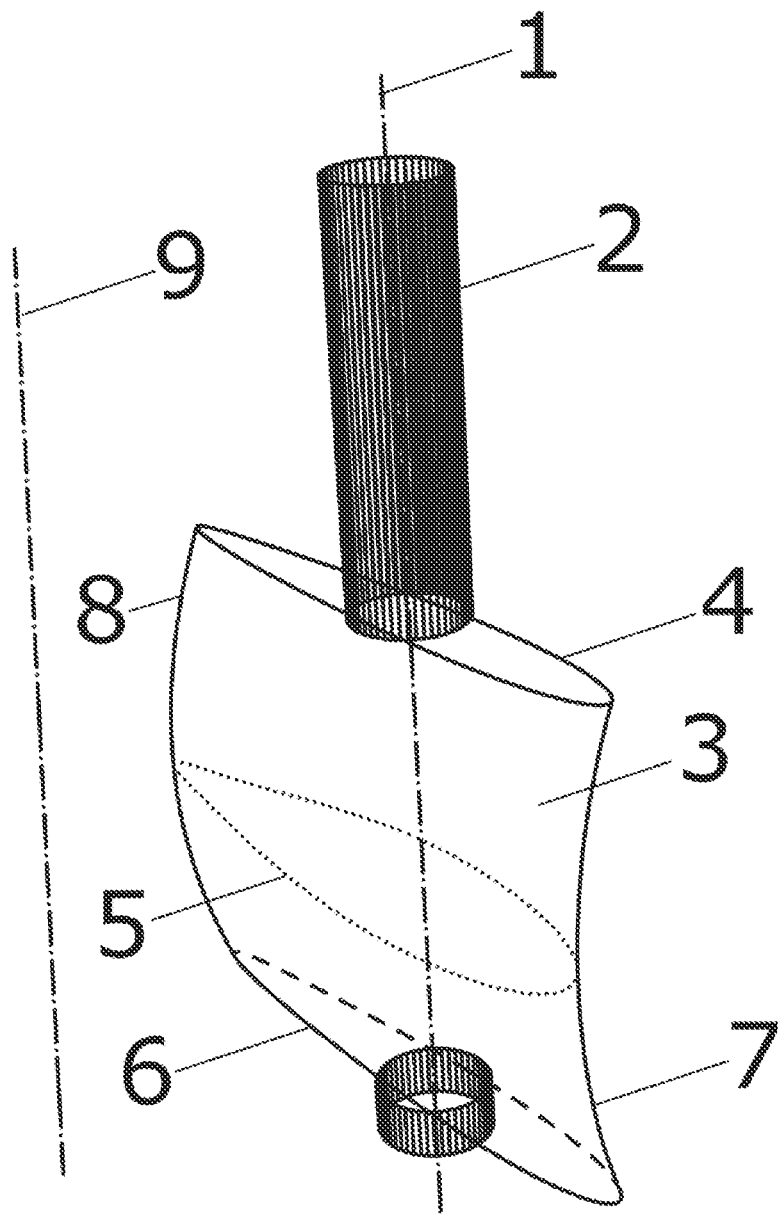
FIG. 6 shows a perspective view of a fourth embodiment of a guide vane according to the disclosure.

FIG. 6 illustrates a guide vane body 3 that is structured analogously to FIG. 4. However, the flow-stabilising flow profile 5 is not rotated around a straight line here, but is positioned radially in relation to a straight line 9.

Figure 7:
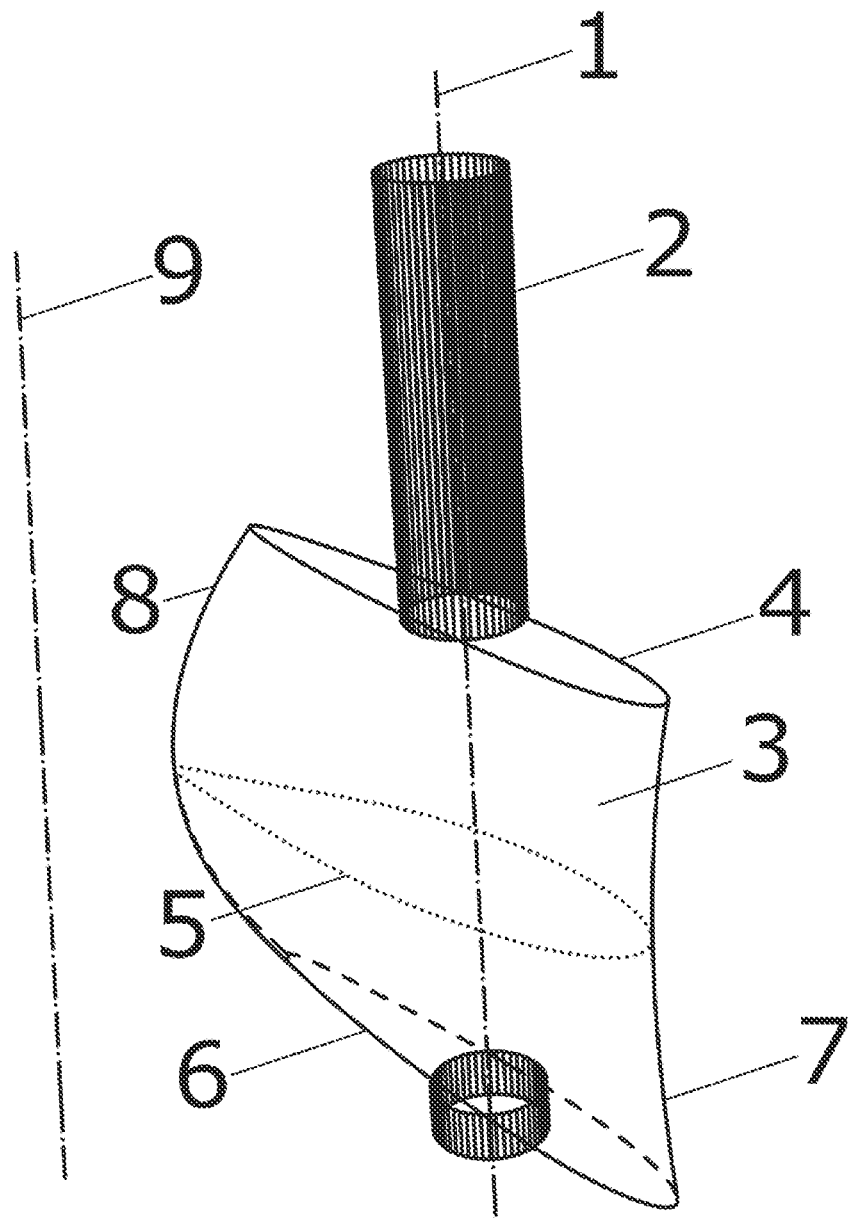
FIG. 7 shows a perspective view of a fifth embodiment of a guide vane according to the disclosure.

FIG. 7 now shows a variant of the invention that combines embodiments from FIG. 5 and FIG. 6. Thus, the flow profile 5 is rotated around a straight line 9 and displaced radially in relation to the straight line 9. The straight line 9, for example, is positioned in parallel to the guide vane axis of rotation 1. The turbine leading edge 7 and the turbine trailing edge 8 are curved. Flow profile 5, for example, stabilises the flow, while flow profiles 4 and 6 maximize the efficiency. The connecting lines between the individual flow profiles 4, 5 and 6 correspond advantageously to B-spline curves.

Figure 8:
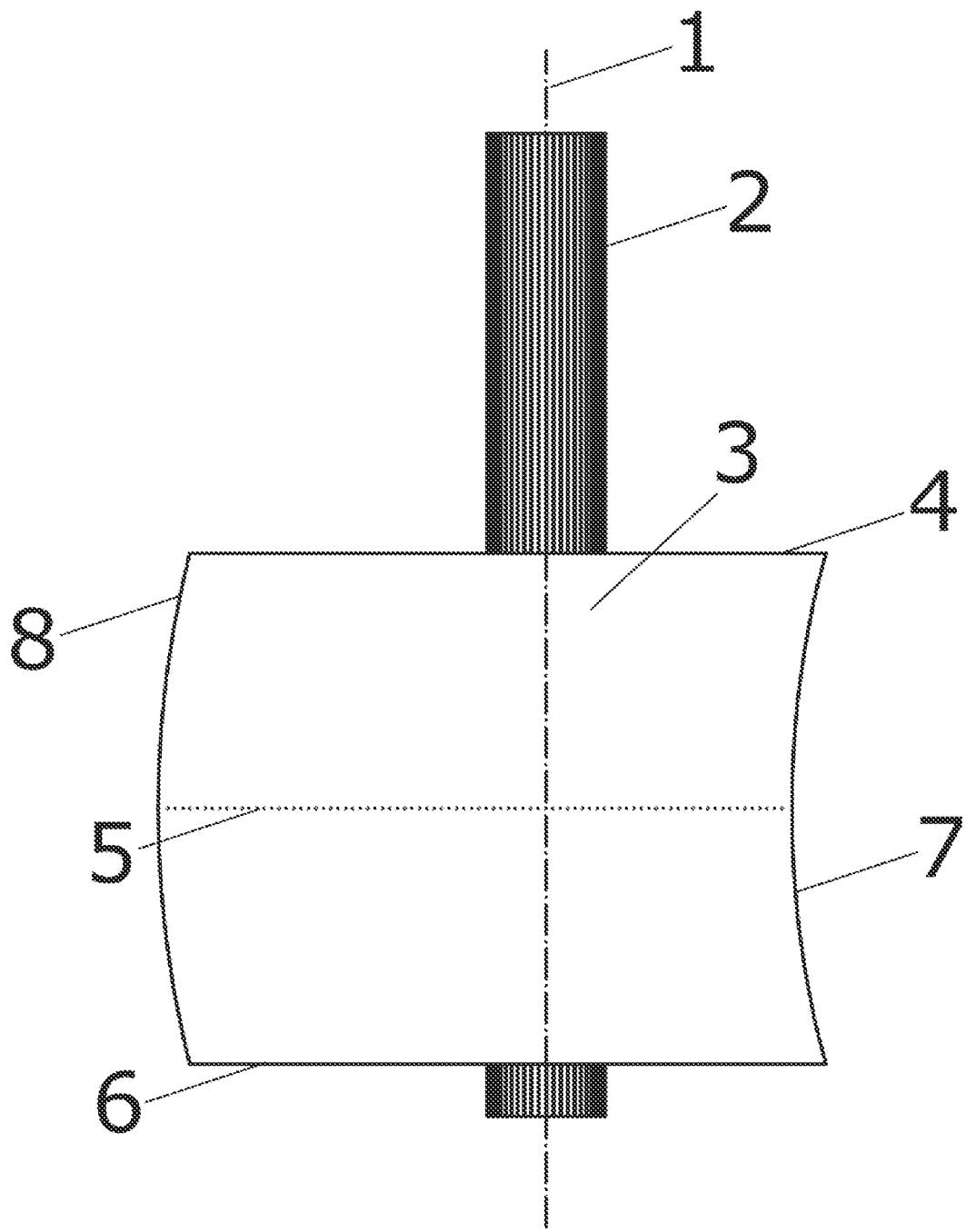
FIG. 8 shows a side view of a guide vane as shown in FIG. 7.

FIG. 8 shows a side view of the variant according to FIG. 7. The displacement and/or rotation and the curved turbine leading edge 7 and turbine trailing edge 8 are clearly visible here.

Figure 9:
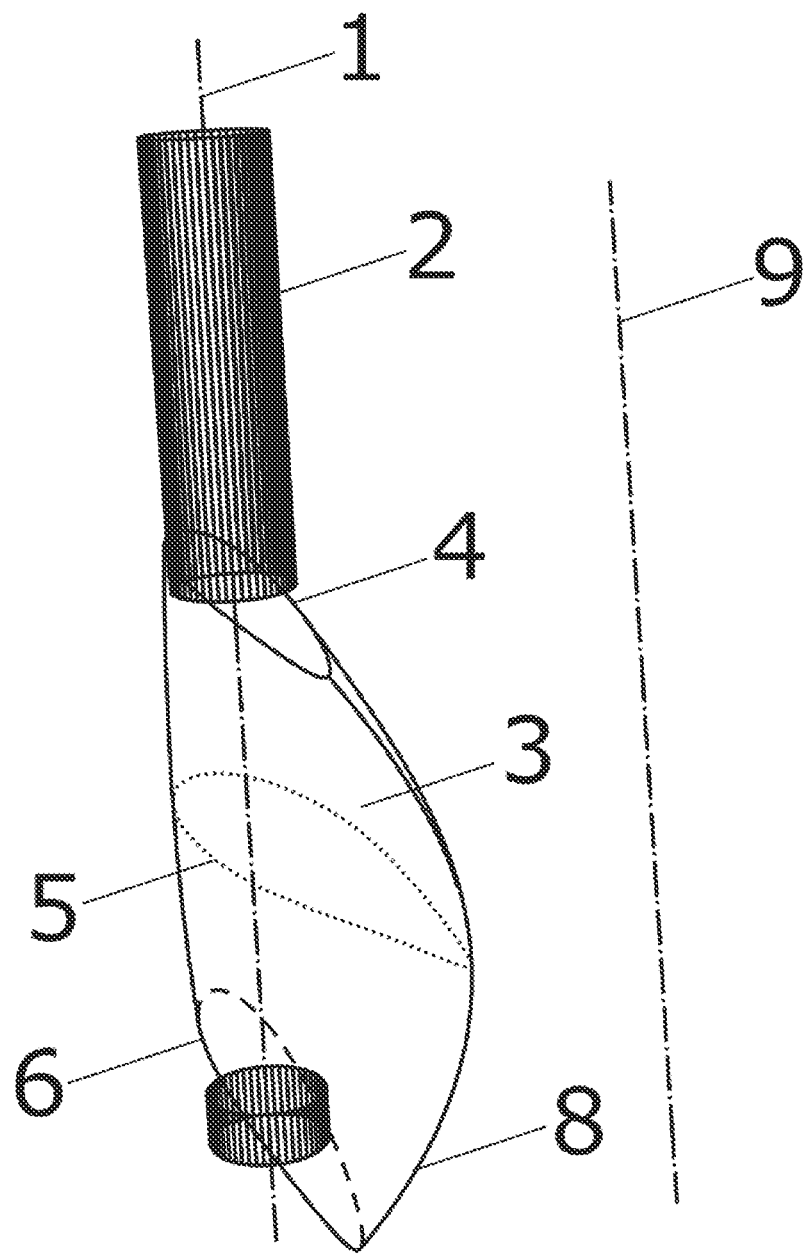
FIG. 9 shows a perspective view (looking towards the turbine trailing edge) of a guide vane as shown in FIG. 7.

FIG. 9 shows a perspective view of the variant according to FIG. 7, looking towards the turbine trailing edge 8. Rotation of the flow profile 5 compared to flow profiles 4 and 6 is particularly clear to see here.

Figure 10:
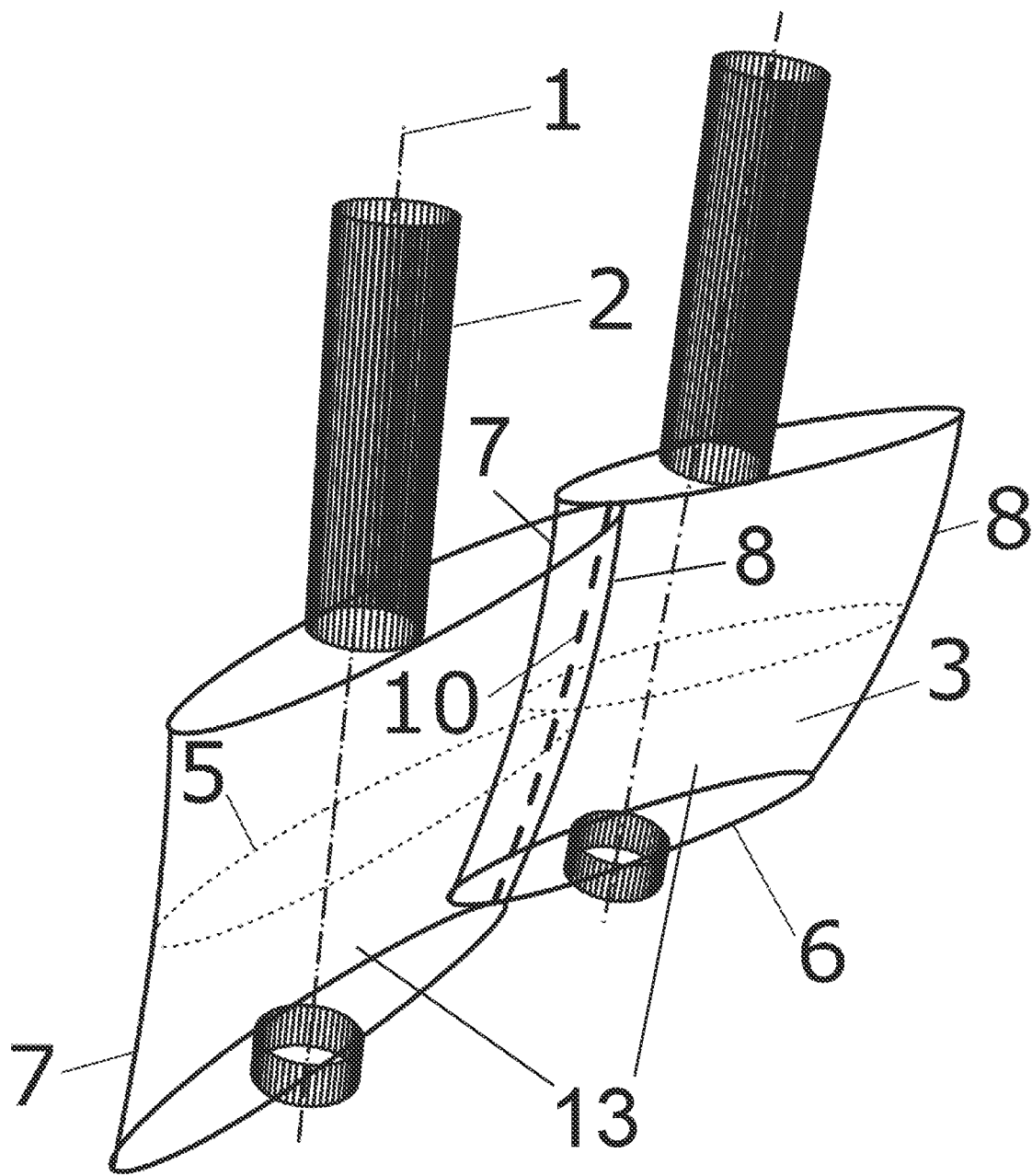
FIG. 10 shows two adjacent guide vanes of the wicket gate.

In FIG. 10, two adjacent guide vanes 13 of the wicket gate 16 are shown when the wicket gate 16 is closed. Here it is clear that the two guide vanes 13 are in contact along the closing edge 10. It is also clear that the closing edge 10 need not coincide with the turbine leading edge 7 or the turbine trailing edge 8.

Figure 11:
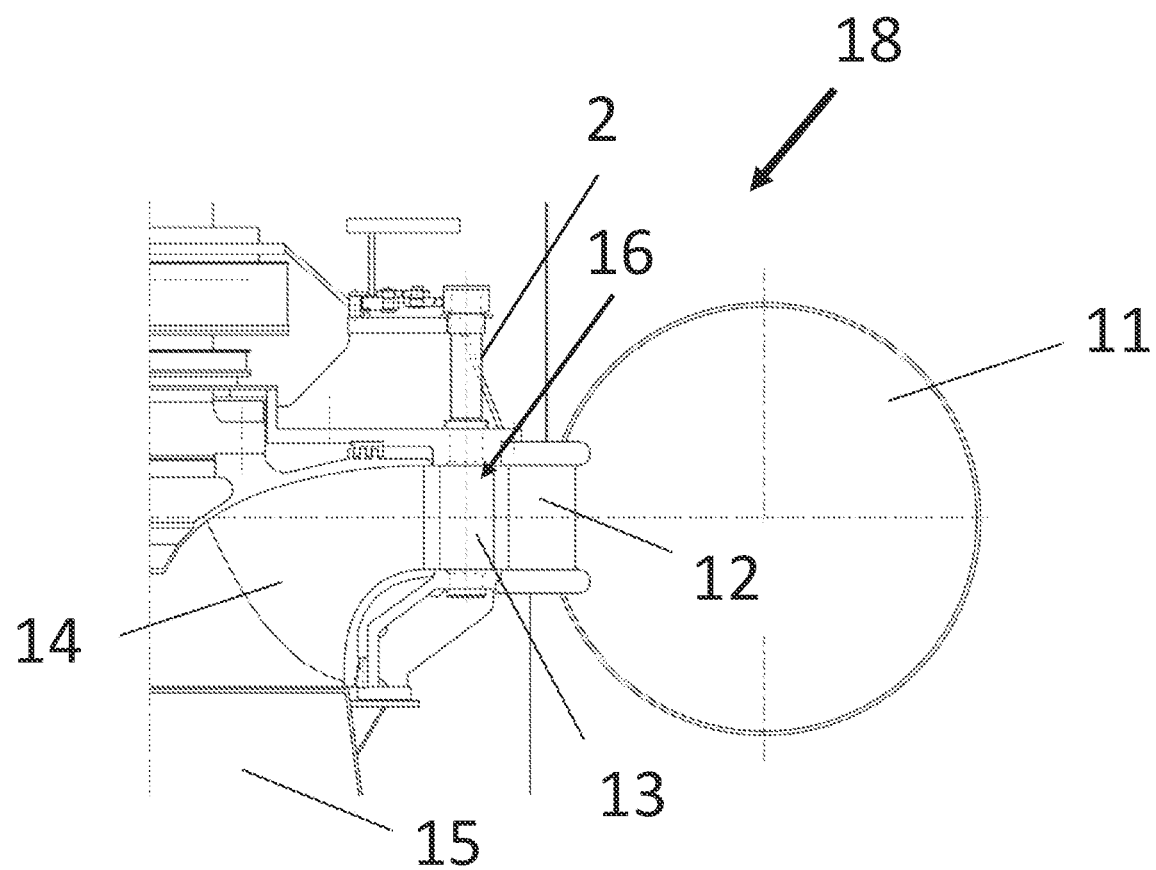
FIG. 11 shows a sectional view of a reversible pump-turbine.

FIG. 11 shows a sectional view of a reversible pump-turbine 18. In turbine operation, the water flows downstream from the volute casing 11 through the stationary stay vanes 12 and then through the adjustable guide vanes 13 of the wicket gate 16. After this, the water passes the runner 14 and leaves the reversible pump-turbine 18 via the draft tube 15.

Figure 12:
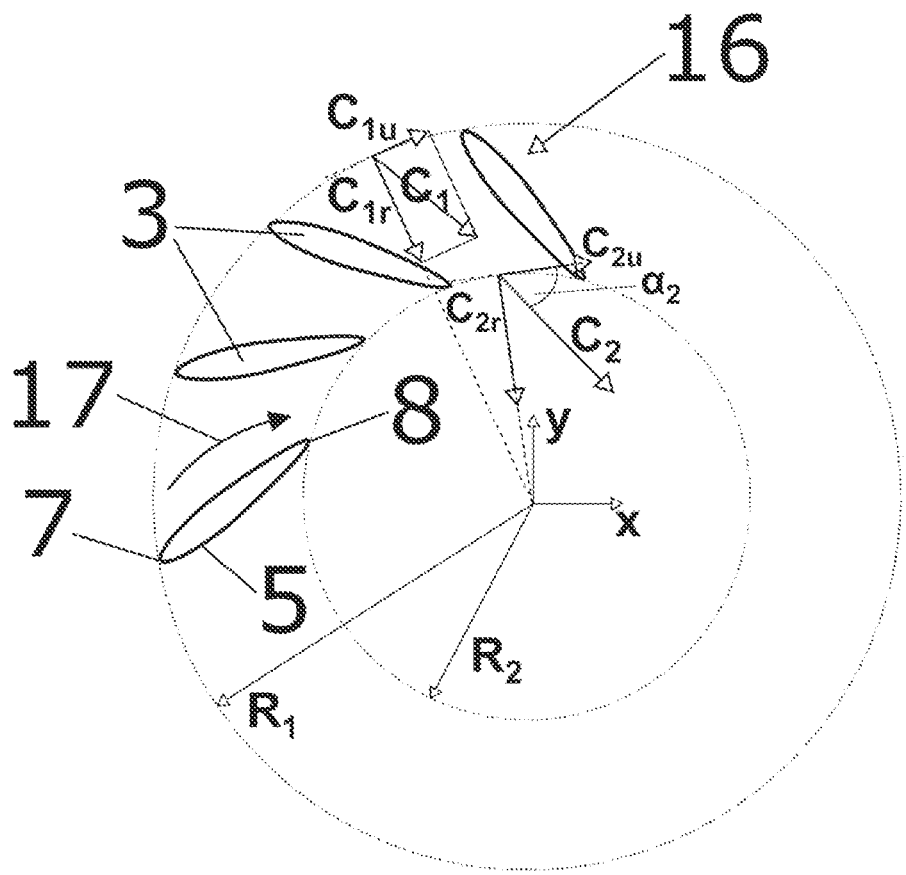
FIG. 12 shows the velocity triangles on the guide vanes.

The velocity triangles on the guide vanes 13 are shown in FIG. 12. The turbine flow 17 is indicated by an arrow. The individual variables here refer to the following parameters:

$R_1$ Radius of the guide vane leading edge in turbine direction to the main machine axis $C_1$ Absolute velocity at the guide vane leading edge in turbine direction $C_{1u}$ Circumferential component of the absolute velocity at the guide vane leading edge in turbine direction $C_{1r}$ Radial component of the absolute velocity at the guide vane leading edge in turbine direction $R_2$ Radius of the guide vane trailing edge in turbine direction to the main machine axis $C_2$ Absolute velocity at the guide vane trailing edge in turbine direction $C_{2u}$ Circumferential component of the absolute velocity at the guide vane trailing edge in turbine direction $C_{2r}$ Radial component of the absolute velocity at the guide vane trailing edge in turbine direction $\alpha_2$ Absolute flow angle of the absolute velocity at the guide vane trailing edge in turbine direction in relation to the corresponding circumferential component of the absolute velocity $C_{2u}$ at the guide vane trailing edge in turbine direction, i.e. the included angle between $C_2$ and $C_{2u}$ Where index 1 corresponds to the guide vane leading edge in turbine direction and index 2 to the guide vane trailing edge in turbine direction. The index u refers to the circumferential component and index r to the radial component.

$R_1$ and $R_2$—and thus the guide vane leading and trailing edges—are dependent upon the opening angle of the guide vane.

Elements of the inventive embodiments described herein are identified as follows:

1 Axis of rotation
2 Pivot
3 Guide vane body
4 Flow profile
5 Flow profile
6 Flow profile
7 Turbine leading edge
8 Turbine trailing edge
9 Straight line
10 Closing edge
11 Volute casing
12 Stay vanes
13 Guide vanes
14 Runner
15 Draft tube
16 Wicket gate
17 Turbine flow
18 Pump-turbine
19 Flow-guiding surface
20 Flow-guiding surface
21 End face
22 End face

The invention claimed is:

1. A pump-turbine wicket gate comprising plural guide vanes that each comprise a guide vane body having opposite end faces and being pivotable about an axis of rotation via a pivot, the guide vane body having a turbine leading edge facing a direction of turbine flow and a turbine trailing edge facing away from the direction turbine flow, wherein the guide vanes of the wicket gate can assume a closed position and an open position and, when in the closed position, respective adjacent guide vanes contact one another along respective closing edges defined contact curves, each guide vane having two flow-guiding surfaces positioned on opposite sides of the axis of rotation and being limited by the opposite end faces, the flow-guiding surfaces forming different flow profiles, and wherein one flow profile of said different flow profiles is located in a mid-span section of each respective guide vane and has a larger guide vane angle toward the turbine trailing edge than other flow profiles of said different flow profiles in a boundary area of each respective guide vane proximate the opposite end faces, such that, in the open position, the one flow profile in the mid-span section of each respective guide vane creates a larger absolute flow angle ($\alpha 2$) of absolute velocity (C2) of the turbine flow at the guide vane trailing edge in a turbine direction with regard to a related circumferential component of the absolute velocity (C2u) of the turbine flow, than one of the other flow profiles in the boundary area such that the turbine flow in the turbine direction leaves the guide vane body in the mid-span section with a larger flow angle ($\alpha 2$) than in the boundary area.

2. The pump-turbine wicket gate of claim 1, wherein the turbine trailing edge is curved at least once.

3. The pump-turbine wicket gate of claim 1, wherein the closing edge is curved at least once.

4. The pump-turbine wicket gate of claim 1, wherein the closing edge has a double curvature.

5. The pump-turbine wicket gate of claim 2, wherein the turbine trailing edge has a double curvature.

6. The pump-turbine wicket gate of claim 1, wherein the turbine trailing edge is curved in the mid-span section in a direction that is perpendicular to a plane defined by the axis of rotation and a connecting line between the turbine leading edge and the turbine trailing edge.

7. The pump-turbine wicket gate of claim 2, wherein the turbine trailing edge is curved in the mid-span section in a direction that is perpendicular to a plane defined by the axis of rotation and a connecting line between the turbine leading edge and the turbine trailing edge.

8. The pump-turbine wicket gate of claim 3, wherein the turbine trailing edge is curved in the mid-span section in a direction that is perpendicular to a plane defined by the axis of rotation and a connecting line between the turbine leading edge and the turbine trailing edge.

9. The pump-turbine wicket gate of claim 6, wherein the turbine trailing edge is curved in a direction of a guide vane pressure side.

10. The pump-turbine wicket gate of claim 1, wherein a position of at least one of said flow profiles is rotated around a straight line that is disposed parallel to the axis of rotation.

11. The pump-turbine wicket gate of claim 2, wherein a position of at least one of said flow profiles is rotated around a straight line that is disposed parallel to the axis of rotation.

12. The pump-turbine wicket gate of claim 3, wherein a position of at least one of said flow profiles is rotated around a straight line that is disposed parallel to the axis of rotation.

13. The pump-turbine wicket gate of claim 1, wherein a radial position of at least one of said flow profiles is misaligned in relation to a straight line that is disposed parallel to the axis of rotation.

14. The pump-turbine wicket gate of claim 1, wherein the turbine leading edge is curved at least once.

15. The pump-turbine wicket gate of claim 2, wherein the turbine leading edge is curved at least once.

16. The pump-turbine wicket gate of claim 3, wherein the turbine leading edge is curved at least once.

17. The pump-turbine wicket gate of claim 1, wherein the turbine trailing edge is curved at least once such that an inflection point of the curve lies in the mid-span section.

18. The pump-turbine wicket gate of claim 1, wherein the other flow profiles in the respective boundary area are not congruent.

19. The pump-turbine wicket gate of claim 1 arranged on a reversible pump-turbine having a runner.

20. A pump-turbine wicket gate comprising plural guide vanes that each comprise a guide vane body having opposite end faces and being pivotable about an axis of rotation via a pivot, the guide vane body having a turbine leading edge facing a direction of turbine flow and a turbine trailing edge facing away from the direction turbine flow, wherein the guide vanes of the wicket gate can assume a closed position and an open position and, when in the closed position, respective adjacent guide vanes contact one another along respective closing edges defined contact curves, each guide vane having two flow-guiding surfaces positioned on opposite sides of the axis of rotation and being limited by the opposite end faces, the flow-guiding surfaces forming different flow profiles, wherein one flow profile of said different flow profiles is located in a mid-span section of each respective guide vane and has a larger guide vane angle toward the turbine trailing edge than other flow profiles of said different flow profiles in a boundary area of each respective guide vane proximate the opposite end faces, such that, in the open position, the one flow profile in the mid-span section of each respective guide vane creates a larger absolute flow angle ($\alpha 2$) of absolute velocity (C2) of the turbine flow at the guide vane trailing edge in a turbine direction with regard to a related circumferential component of the absolute velocity (C2u) of the turbine flow, than one of the other flow profiles in the boundary area such that the turbine flow in the turbine direction leaves the guide vane body in the mid-span section with a larger flow angle ($\alpha 2$) than in the boundary area, and wherein the turbine leading edge, the turbine trailing edge and the closing edge are each curved at least once, and the turbine trailing edge is curved in the mid-span section in a direction that is perpendicular to a plane defined by the axis of rotation and a connecting line between the turbine leading edge and the turbine trailing edge.

21. A reversable pump-turbine comprising:
a runner; and
a wicket gate comprising plural adjustable guide vanes that each comprise a guide vane body having opposite end faces and being pivotable about an axis of rotation via a pivot, the guide vane body having a turbine leading edge facing a direction of turbine flow and a turbine trailing edge facing away from the direction turbine flow, wherein the guide vanes of the wicket gate can assume a closed position and an open position and, when in the closed position, respective adjacent guide vanes contact one another along respective closing edges defined contact curves, each guide vane having two flow-guiding surfaces positioned on opposite sides of the axis of rotation and being limited by the opposite end faces, the flow-guiding surfaces forming different flow profiles, and wherein one flow profile of said different flow profiles is located in a mid-span section of each respective guide vane and has a larger guide vane angle toward the turbine trailing edge than other flow profiles of said different flow profiles in a boundary area of each respective guide vane proximate the opposite end faces, such that, in the open position, the one flow profile in the mid-span section of each respective guide vane creates a larger absolute flow angle ($\alpha 2$) of absolute velocity (C2) of the turbine flow at the guide vane trailing edge in a turbine direction with regard to a related circumferential component of the absolute velocity (C2u) of the turbine flow, than one of the other flow profiles in the boundary area such that the turbine flow in the turbine direction leaves the guide vane body in the mid-span section with a larger flow angle ($\alpha 2$) than in the boundary area.

* * * * *